(12) United States Patent
Phoenix et al.

(10) Patent No.: US 6,886,012 B1
(45) Date of Patent: Apr. 26, 2005

(54) PROVIDING TRADITIONAL UPDATE SEMANTICS WHEN UPDATES CHANGE THE LOCATION OF DATA RECORDS

(75) Inventors: San Yu Phoenix, Redlands, CA (US); Kalpana Shyam, Los Altos, CA (US); James Zu-Chia Teng, San Jose, CA (US); Julie Ann Watts, Morgan Hill, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 09/193,966

(22) Filed: Nov. 18, 1998

(51) Int. Cl.[7] ............................ G06F 17/30; G06F 7/00

(52) U.S. Cl. ............................ 707/8; 707/201; 707/202

(58) Field of Search .............................. 707/1–4, 8, 10, 707/100–103, 200–203

(56) References Cited

U.S. PATENT DOCUMENTS

| | | | |
|---|---|---|---|
| 4,914,569 A | * 4/1990 | Levine et al. ................... 707/8 |
| 4,961,139 A | * 10/1990 | Hong et al. .................... 707/1 |
| 5,175,849 A | * 12/1992 | Schneider ................... 707/202 |
| 5,247,672 A | * 9/1993 | Mohan ........................ 711/152 |
| 5,276,872 A | * 1/1994 | Lomet et al. ............... 707/202 |
| 5,285,528 A | * 2/1994 | Hart ........................... 710/200 |
| 5,440,732 A | * 8/1995 | Lomet et al. ................... 707/1 |
| 5,455,946 A | * 10/1995 | Mohan et al. .............. 707/202 |
| 5,485,607 A | * 1/1996 | Lomet et al. ................... 707/8 |
| 5,485,608 A | * 1/1996 | Lomet et al. ............... 707/202 |
| 5,511,190 A | 4/1996 | Sharma et al. ............. 395/600 |
| 5,519,413 A | 5/1996 | Thomas et al. ............. 345/185 |
| 5,522,077 A | * 5/1996 | Cuthbert et al. ........... 707/103 |
| 5,551,027 A | * 8/1996 | Choy et al. ................. 707/201 |
| 5,625,815 A | 4/1997 | Maier et al. ................ 395/608 |
| 5,630,124 A | 5/1997 | Coyle, Jr. et al. ........... 395/614 |
| 5,706,494 A | 1/1998 | Cochrane et al. ........... 395/602 |
| 5,717,919 A | * 2/1998 | Kodavalla et al. ............. 707/8 |
| 5,717,921 A | * 2/1998 | Lomet et al. ............... 707/100 |
| 5,737,601 A | 4/1998 | Jain et al. ................... 395/617 |
| 5,742,806 A | 4/1998 | Reiner et al. ............... 395/600 |
| 5,758,344 A | 5/1998 | Prasad et al. ................. 707/10 |
| 5,761,659 A | * 6/1998 | Bertoni ......................... 707/8 |
| 5,764,877 A | * 6/1998 | Lomet et al. ................. 714/6 |
| 5,806,065 A | * 9/1998 | Lomet ........................... 707/8 |
| 5,835,904 A | * 11/1998 | Vicik et al. ................... 707/1 |
| 5,960,194 A | * 9/1999 | Choy et al. ................. 707/102 |
| 6,009,425 A | * 12/1999 | Mohan .......................... 707/8 |
| 6,070,170 A | * 5/2000 | Friske et al. ............... 707/202 |
| 6,122,644 A | * 9/2000 | Graefe et al. .............. 707/202 |
| 6,144,983 A | * 11/2000 | Klots et al. ................. 709/104 |

OTHER PUBLICATIONS

Mohan, C. "Aries/LHS: A Concurrency Control and Recovery Method Using Write–Ahead Logging for Linear Hashing with Separators", Proceedings of the 9th International Conference on the Data Engineering, 1993, pp. 243–252.*

Mohan, C. "ARIES/KLV: A Key–Value Locking Method for Concurrency Control of Multiaction Transactions Operating on B–Tree Indexes", Proceedings of the 16th very Large Database Conference, Aug. 1990, pp. 392–405.*

Lomet, D.B. "Key Range Locking Strategies for Improved Concurrency", Proceedings of the 19th Very Large Database Conference, Aug. 24–27, 1993, pp. 655–664.*

(Continued)

*Primary Examiner*—Luke S Wassum
(74) *Attorney, Agent, or Firm*—Gates & Cooper LLP (57) ABSTRACT

Traditional update semantics are provided when updates change the location of records in a database. The system detects that an update to a record will cause the record to change locations in a database from an original location to an updated location. The system selectively prevents activity in the database between the original location and update location until the updated record has changed locations in the database from the original location to the updated location.

63 Claims, 5 Drawing Sheets

OTHER PUBLICATIONS

Kornacker, M., Mohan, C., and Hellerstein, J.M. "Concurrency and Recovery in Generalized Search Trees". Proceedings of the ACM SIGMOD International Conference on Management of Data, May 11–15, 1997, pp. 62–72.*

Mohan, C. "Disk Read–Write Optimizations and Data Integrity in Transaction Systems Using Write–Ahead Logging". Proceedings of the Eleventh International Conference on Data Engineering, 1995. pp. 324–331.*

Mohan, C. "IBM's Relational DBMS Products: Features and Technologies". Proceedings of the 1993 ACM SIGMOD International Conference on Management of Data, May 25–28, 1993. pp. 445–448.*

Mohan, C. "Less Optimistic Concurrency Control". Second International Workshop on Research Issues on Data Engineering: Transaction and Query Processing, 1992. pp. 199–204.*

Mohan, C. "Commit_LSN: A Novel and Simple Method for Reducing Locking and Latching in Transaction Processing System". Proceedings of the Sixteenth Conference on Very Large Databases, Aug. 1990. pp. 406–418.*

Mohan, C. "ARIES/KVL: A Key–Value Locking Method for Concurrency Control of Multiaction Transactions Operating on B–Tree Indexes". Proceedings of the Sixteenth Conference on Very Large Database, Aug. 1990, pp. 392–405.*

"Elimination of Lock Contention in Relational Databases Accessed by Read–Only Queries and On–Line Update Transactions". IBM Technical Disclosure Bulletin, vol. 31, No. 1, Jun. 1998. pp. 180–185.*

"Integrated Concurrency and Shared Buffer Conherency Control for Multi–Systems". IBM Technical Disclosure Bulletin, vol. 28, No. 10, Mar. 1986. pp. 4642–4650.*

"Shared Memory Management for Transaction Speed–Up in a Multi–System Environment". IBM Technical Disclosure, vol. 28, No. 10, Mar. 1986. pp. 4520–4535.*

Kung, H.T., and Lehman, P.L. "Concurrent Manipulation of Binary Search Trees". ACM Transactions on Database Systems, vol. 5, No. 3, Sep. 1980. pp. 354–382.*

Saigal, R., "Matrix Partitioning Methods for Interior Point Algorithms," Sadhana, vol. 22, Pt. 4, Aug. 1997, IEE, 1998, pp. 575–587.

Research Document, "Partitioned Tables Unique Constraint Enforcement to Data–base Management—Providing Global Enforcement of Constraint if Same Key Value Appears in More Than One Partition," RD–340009, Aug. 10, 1992.

IBM Technical Bulletin, "On–Line Data Redistribution in a Shared–Nothing Parallel Database System," Vo. 40, No. 01, Jan. 1997, pp. 157–160.

Saigal, R., "Matrix Partitioning Methods for Interior Point Algorithms," Sadhana, vol. 22, Pt. 4, Aug. 1997, IEE, 1998, pp. 575–587. * Abstract only.

Research Document, "Partitioned Tables Unique Constraint Enforcement to Data–base Management—Providing Global Enforcement of Constraint if Same Key Value Appears in More Than One Partition," RD–340009, Aug. 10, 1992. * Abstract only.

* cited by examiner

PROVIDING TRADITIONAL UPDATE SEMANTICS WHEN UPDATES CHANGE THE LOCATION OF DATA RECORDS

BACKGROUND OF THE INVENTION

1. Field of the Invention

This invention relates in general to database management systems performed by computers, and in particular, to a method of providing traditional update semantics when updates change the location of records in a database.

2. Description of Related Art

Computer systems incorporating Relational DataBase Management System (RDBM) software using a Structured Query Language (SQL) interface are well known in the art. The SQL interface has evolved into a standard language for RDBMS software and has been adopted as such by both the American National Standards Organization (ANSI) and the International Standards Organization (SO).

In RDBMS software, all data is externally structured into tables comprised of rows (records) and columns (fields). SQL operations upon the data are generally row-oriented and include insert, update and delete operations, as well as select (retrieve) operations, join operations to concatenate data retrieved from multiple tables, etc.

When tables are large, containing many rows of data, it is preferable to divide the table into partitions, where each partition corresponds to a separate unit of storage and contains a portion of the rows in the table. By partitioning tables, the speed and efficiency of data access can be improved.

For example, partitions containing more frequently accessed data can be placed on faster devices and parallel processing of data can be improved by spreading partitions over different DASD (direct access storage device) volumes, with each I/O (input/output) stream on a separate channel path. Partitioning also promotes high data availability, enabling application and utility activities to progress in parallel on different partitions of data. This is referred to as "partition independence".

Data may be divided among the partitions of a table by a variety of schemes. For example, one scheme is to partition data based upon a range of values for a designated set of columns, herein called the partitioning key columns. When a row is inserted into a table so partitioned, the values in the partitioning key column(s) of the row dictate the partition of the table into which the row is inserted. Similarly, an update that changes the value in a partitioning key column of a row could change the partition to which the row belongs, thereby requiring a change in the location of the data row.

The prior art teaches that when an updated row does not fit in the space occupied by the original row, the updated row should be placed elsewhere and the original row changed into a pointer record that locates the updated row. By providing this level of indirection, the updated row has not conceptually moved. Indexes continue to reference the original row's location and need not be updated to locate the updated row directly. By allowing access to the updated row only via its pointer record, other applications that are retrieving rows from the table by scanning the table in row sequence will not "see" a given row multiple times or not at all because of row movement.

It is not attractive to adopt this technique for dealing with an updated row that no longer belongs to its current partition because the pointer record would point from one partition into another. This is not attractive because it erodes partition independence, hampers parallel processing techniques, and hinders data access techniques that rely on identifying the partition to which a data row belongs based on the row location referenced in the rows index entries.

Moving a row from its original to its new partition does not have the above problems. However, row movement can cause access paths that retrieve data in row sequence (or in row sequence within key value) to see a data row multiple times or not at all. For example, the row could be retrieved from it original position, then again from its new position. These are not the traditional semantics of the effect of update operations on concurrent readers.

Row movement also makes the notion of cursor position less straightforward. For purposes of "operate on the current row again" operations, the position after an update that moves the row should be on the moved row. For purposes of "operate on the next row" operations, the position should be at the original row location.

Due to these or other difficulties, products on the market today either disallow the update of values in partitioning key columns, or they allow the update provided the update does not alter the partition to which the row belongs. Thus, there is a need in the art for improved techniques for updating values in partitioning key columns.

SUMMARY OF THE INVENTION

To overcome the limitations in the prior art described above, and to overcome other limitations that will become apparent upon reading and understanding the present specification, the present invention discloses a method, system, and article of manufacture for performing updates in a computer implemented database management system, and particularly for providing traditional update semantics when updates change the location of data records. The system detects that an update to a record will cause the record to change locations in a database from an original location to an updated location. The system selectively prevents activity in the database between the original location and update location until the updated record has changed locations in the database from the original location to the updated location.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention describes a method for providing traditional update semantics when update operations cause rows to change location. Specifically, the preferred embodiment of the present invention applies to updates that cause rows to change partitions.

Hardware Environment

Figure 1:
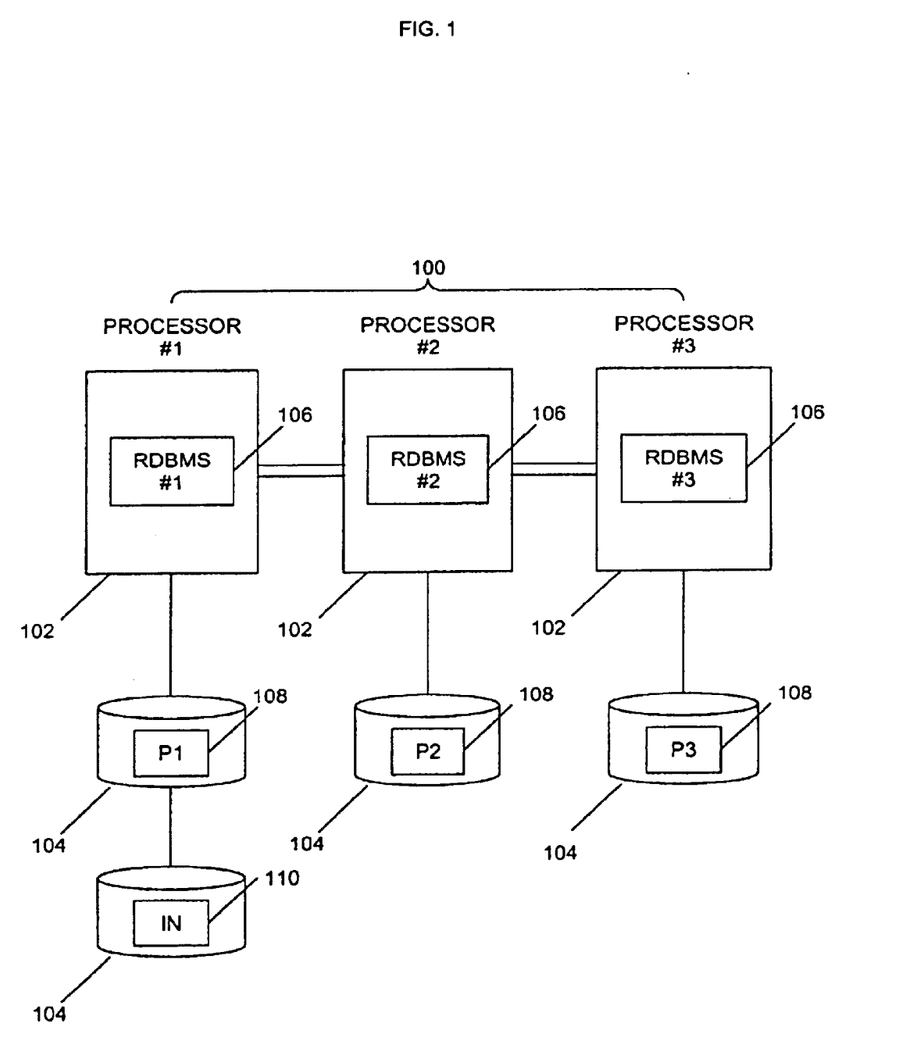
FIG. 1 illustrates an exemplary computer hardware environment that could be used with the preferred embodiment of the present invention.

FIG. 1 illustrates an exemplary computer hardware environment that could be used with the preferred embodiment of the present invention. In the exemplary environment, a massively parallel processing (MPP) computer system 100 is comprised of a plurality of interconnected processors 102, each of which is connected to one or more data storage devices 104.

Each of the processors 102 execute one or more threads of a database management system (DBMS) software 106, so that processing functions are divided among the processors 102 in the computer system 100. Further, each of the data storage devices 104 store one or more partitions (labeled as P1,P2,P3) 108 of one or more tables in one or more databases in order to fully parallelize access and retrieval functions among both the processors 102 and the data storage devices 104. In addition, one or more of the data storage devices 104 may also store one or more indices (labeled as IN) 110 of the table in the relational database.

Operators of the computer system 100 use a terminal or workstation to transmit electrical signals to and from the computer system 100 that represent commands for performing various operations against the databases. In the preferred embodiment, these operations conform to the Structured Query Language (SQL) standard and invoke functions performed by the DBMS software 106.

Generally, the DBMS software 106 comprises instructions and/or data that is embodied in or retrievable from a computer-readable device, medium, or carrier, e.g., a memory, a data storage device 104, a remote device coupled to the computer system 100 by a data communications device, etc. Moreover, these instructions and/or data, when read, executed, and/or interpreted by the computer system 100, cause the computer system 100 to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture", or alternatively, "computer program carrier", as used herein is intended to encompass instructions and/or logic and/or data accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Description of the Optimization Technique

Figure 2A:
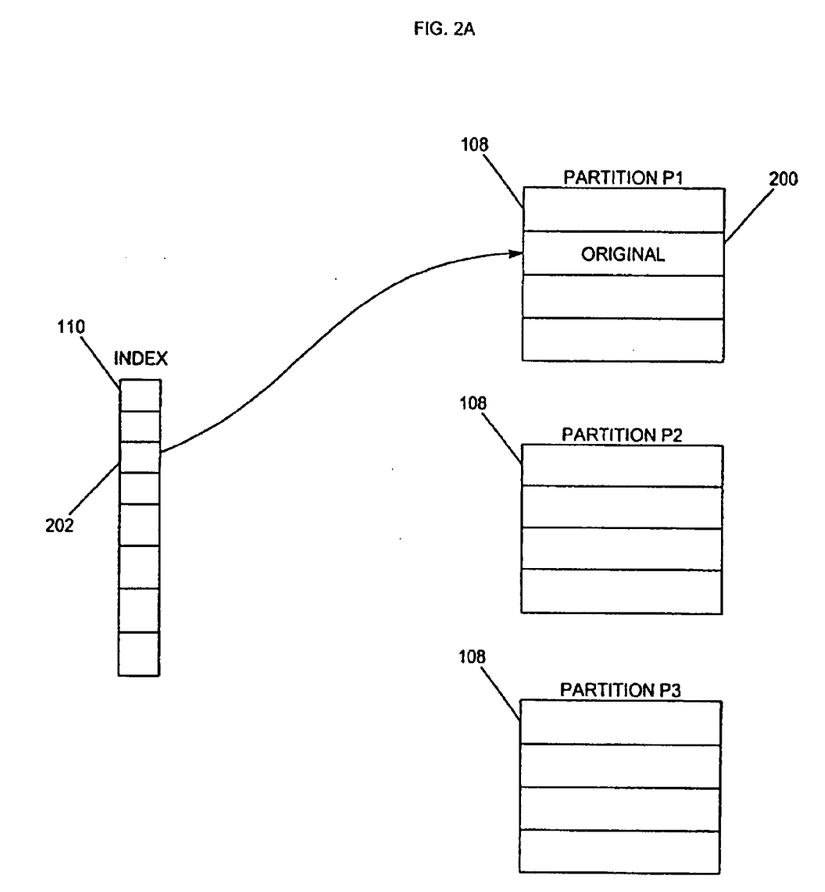
FIGS. 2A, 2B, and 2C are exemplary block diagrams that illustrate the operation of the preferred embodiment of the present invention.
Figure 2B:
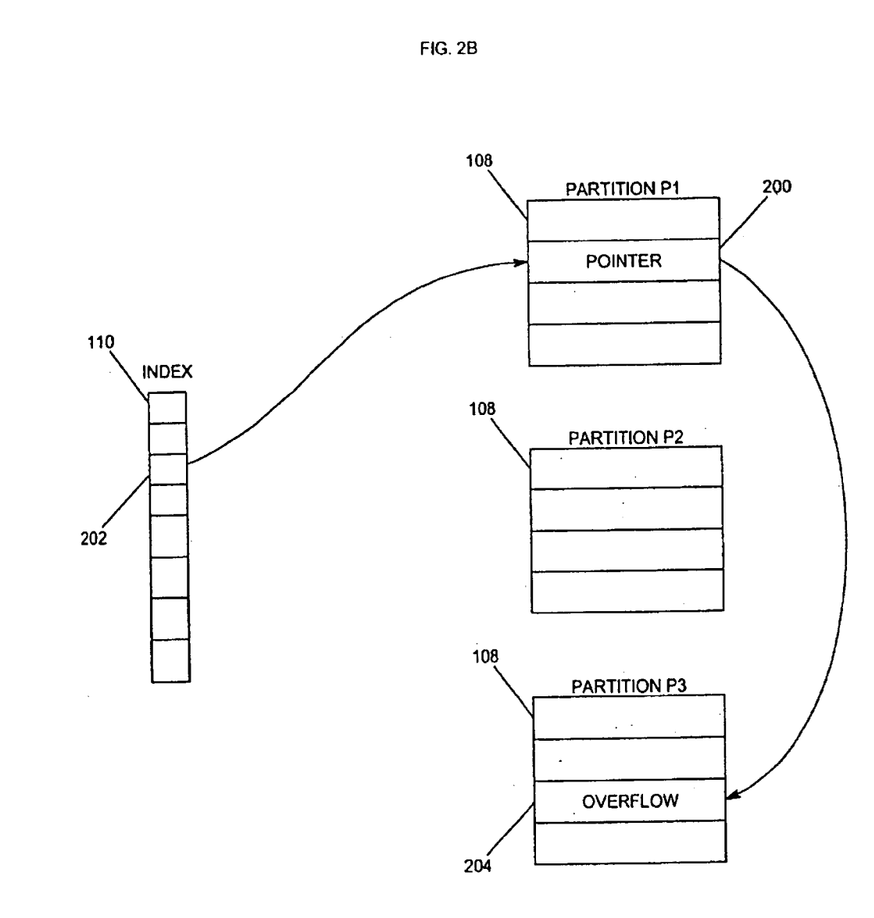
Figure 2C:
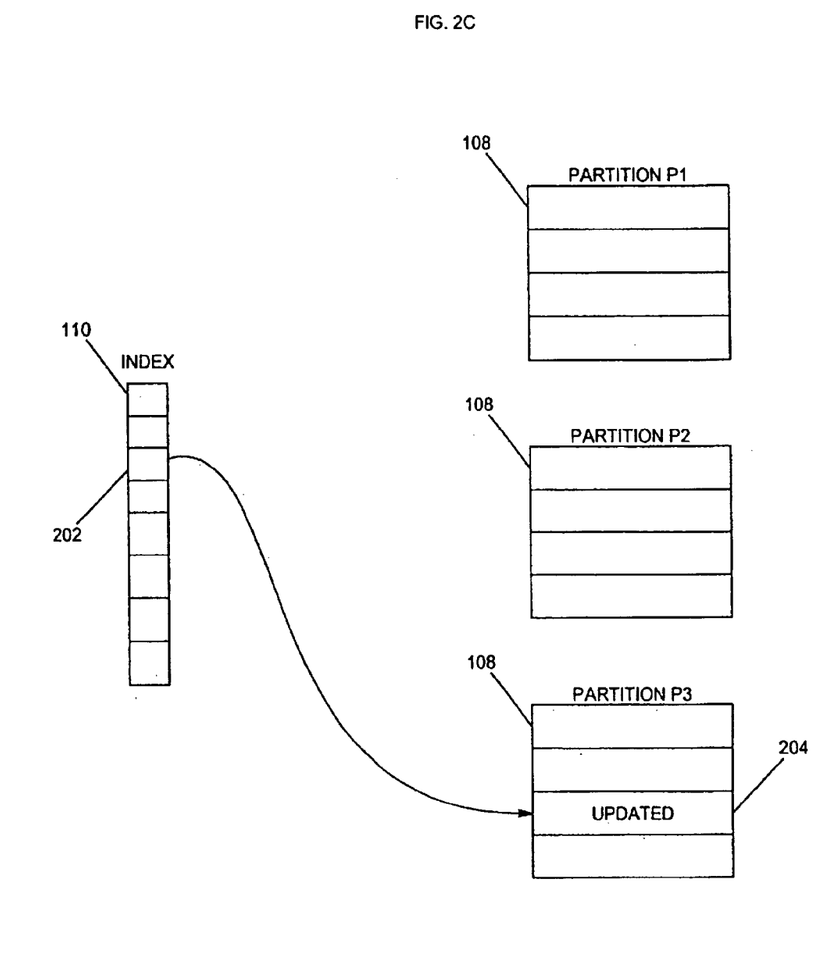

FIGS. 2A, 2B, and 2C are exemplary block diagrams that illustrate the operation of the preferred embodiment of the present invention. The preferred embodiment of the present invention dictates that an update that causes a row to change location occurs in steps.

As illustrated in FIG. 2A, a row resides in its original location 200 in partition P1 108. An entry 202 in the index 110 points to the original location 200 of the row as indicated by the arrow.

As illustrated in FIG. 2B, when an update request is received the row is updated with new values. This update may involve the creation of an overflow record from the updated row, which is then stored at an overflow location 204 in partition P3 108, because of the new values. This update may also involve the creation of a pointer record from the updated row, which is then stored in the original location 200 in partition P1 . The pointer record identifies the overflow location 204 of the overflow record in partition P3 108. However, the index entry 202 continues to reference the original location 200 in partition P1 108, i.e., the pointer record.

As illustrated in FIG. 2C, at some point, the pointer record is collapsed into the overflow record at the overflow location 204, so that there is only a single "normal" (non-pointer, non-overflow) updated row, which is stored at the updated location 204 (usually the same as the overflow location 204). That is, the pointer record is deleted from the original location 200 in partition P1 108, the overflow record stored at the overflow location 204 in partition P3 108 is converted into a nonoverflow, updated row stored at the updated location 204 in partition P3 108, and the entry 202 in the index 110 is modified to directly reference the updated location 204 of the updated row in partition P3 108.

The steps illustrated in FIG. 2C are performed at different times depending upon the degree of concurrency desired between the transaction performing the update and other transactions accessing data in the table. The degree of concurrency also dictates other aspects of processing as discussed below.

Minimal Concurrency Embodiment

When minimal concurrency is required, the preferred embodiment of the present invention dictates the following rules of operation.

Upon detecting that an update to a row will cause the row to change locations, the updating transaction takes exclusive control of (at least) the portion of the table between the original location 200 and overflow/updated location 204. For example, in the preferred embodiment, control is taken of the partition 108 from which the row is being moved, the partition 108 to which the row is being moved, and all partitions 108 in between. The pointer-overflow record construction step of update processing is then performed.

At phase 1 of commit, the pointer-overflow collapse step of update processing is performed, and the exclusive control taken to perform the update is relinquished. If any failure occurs during the collapse of the pointer-overflow records, or if the updating transaction attempts to hold position in the table across commit (and the position is between the original location 200 and overflow/updated location 204), the commit fails.

By taking exclusive control of the portion of the table between the original location 200 and overflow/updated location 204, no transaction other than the updating transaction is in jeopardy of retrieving a row both before and after its movement. By maintaining the pointer-overflow records until commit, the transaction performing the update is prevented from retrieving such a row. Because the pointer-overflow records are transient, however, lasting only as long as exclusive control is maintained, partition independence is not eroded, and parallel processing and data access techniques are hampered only for the updating transaction and only until it commits.

The effect on these techniques is as follows. They are modified to treat locations in partitions 108 that house cross-partition pointer records as potential locations in a targeted partition 108 if that partition 108 houses cross-partition overflow records. The potentiality is investigated by accessing the pointer record and interrogating the overflow location referenced therein.

Moderate Concurrency Embodiment

Taking exclusive control of the portion of the table between the original location 200 and overflow/updated location 204 overly restricts concurrency. Additional concurrency can be realized if that portion of the table is protected from scan operations that retrieve rows in row/record sequence (or row/record sequence within a key value), without blocking probe operations that retrieve rows that lie in that portion of the table. The distinction is that the scan operation is in jeopardy of incorrectly retrieving the row multiple times (or not at all), whereas a probe operation is not.

When the additional concurrency is desired, the preferred embodiment of the present invention dictates the following rules of operation.

Upon detecting that an update to a row will cause the row to change locations, the updating transaction blocks access to scan operations of that portion of the table between the original location 200 and overflow/updated location 204. This is accomplished by taking a low level (row or page) lock on the original location 200 or overflow/updated location 204, whichever would be visited earlier by the scan operation. If that is the overflow/updated location 204, an entry that references the overflow/updated location 204 is placed in each non-unique index defined over the table for scan operations that access the row in row/record sequence within a key value.

The transaction then pauses until all transactions in the portion of the table between the original location 200 and overflow/updated location 204 commit. The act of pausing for transactions to exit a region of data without blocking new transactions from entering the region is termed "acquiring a non-blocking drain" on the region. With the lock blocking entrance to the range, and having waited for transactions already in the range to exit, the range is now empty. The pointeroverflow construction step of update processing is then performed.

At phase 1 of commit, the pointer-overflow collapse step of update processing is performed. If any failure occurs during the collapse of the pointer-overflow records, or if the updating transaction attempts to hold a position in the table across a commit (and the position is between the original location 200 and overflow/updated location 204), the commit fails.

At phase 2 of commit, the lock protecting entry to the range is released, along with all the other low level locks acquired by the transaction. The range may now be entered by scan operations.

Full Concurrency Embodiment

If full concurrency is required between transactions that change a row's location and other transactions operating on the table, the preferred embodiment of the present invention dictates the following rules of operation.

Upon detecting that an update to a row will cause the row to change locations, the pointer-overflow record construction step of update processing is performed.

At some later time, under the direction of a daemon process and unrelated to the commit scope of the updating transaction, the pointer-overflow collapse step of update processing is performed. The daemon process executes a collapse only after acquiring a conditional non-blocking drain on (at least) the portion of the table between the original location 200 and overflow/updated location 204. If the conditional drain is denied, the daemon does not collapse the pointer-overflow records at this time. It will try again later.

Until such time that all pointer-overflow records have been collapsed, partition independence is eroded and parallel processing and data access techniques are hampered for all transactions. The modifications to these techniques (so they deal with cross-partition pointer records) is as discussed above in the section entitled "Minimal Concurrency Embodiment."

Logic of the Optimization Technique

Figure 3:
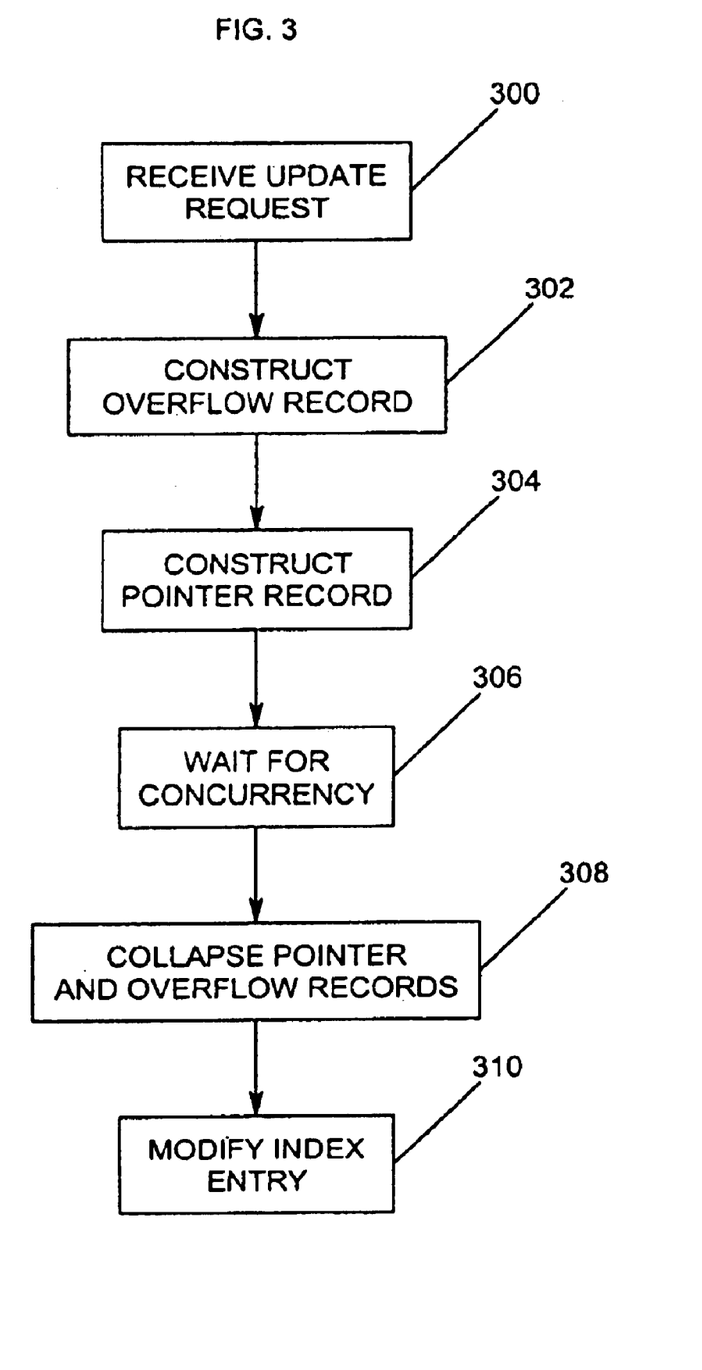
FIG. 3 is a flowchart illustrating the method of optimization technique according to the preferred embodiment of the present invention.

FIG. 3 is a flowchart illustrating the method of optimization technique according to the preferred embodiment of the present invention.

Block 300 represents the RDBMS software receiving an update request, wherein the update involves moving the row.

Block 302 represents the RDBMS software creating an overflow record that is stored at an overflow location 204 from the updated row.

Block 304 represents the RDBMS software creating a pointer record that is stored at the original location 200 from the updated row, wherein the record pointer identifies the overflow location 204 of the overflow record.

Note that the index entry 202 continues to reference the row in the original location 200, i.e., the pointer record.

Block 306 represents the RDBMS software waiting in a manner that depends upon the degree of concurrency desired between the transaction performing the update and other transactions accessing data in the table, as described above.

Block 308 represents the RDBMS software collapsing the pointer record at the original location 200 into the overflow row at the overflow location 204, so that there is only a single "normal" (non-pointer, non-overflow) updated row stored at the located location 204. That is, Block 308 represents the RDBMS software deleting the pointer record from the original location 200 and converting the overflow record located at the overflow location 204 into a non-overflow, updated row stored at the updated location.

Finally, Block 310 represents the RDBMS software modifying the index entry 202 to directly reference the updated location 204 of the updated row.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program providing database management functions could benefit from the present invention.

In summary, the present invention discloses a method, system, and article of manufacture that provides traditional update semantics when updates change the location of records in a database. The system detects that an update to a record will cause the record to change locations in a database from an original location to an updated location.

The system selectively prevents activity in the database between the original location and update location until the updated record has changed locations in the database from the original location to the updated location.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing updates in a computer-implemented database management system, comprising:
   (a) detecting that an update to a record will cause the record to change locations in a database from an original location to an updated location, and
   (b) selectively preventing activity in the database between the original location and update location until the updated record has changed locations in the database from the original location to the updated location.

2. The method of claim 1, wherein the selectively preventing step comprises taking exclusive control of at least a portion of the database between the original location and the updated location until the updated record has changed locations in the database from the original location to the updated location.

3. The method of claim 1, wherein the selectively preventing step comprises preventing any transaction other than the update from retrieving the record until after it is moved to the updated location.

4. The method of claim 1, wherein the selectively preventing step comprises preventing scan operations of at least a portion of the database between the original location and the updated location, while allowing probe operations of the portion of the database between the original location and the updated location.

5. The method of claim 4, wherein the preventing step comprises taking a low level lock on either the original location or the updated location, depending upon whichever would be visited earlier by the scan operation.

6. The method of claim 1, wherein the selectively preventing step comprises pausing until all transactions in the portion of the database between the original location and the updated location have completed.

7. The method of claim 1, wherein the selectively preventing step comprises pausing to allow transactions to exit the portion of the database between the original location and the updated location while blocking new transactions from entering the portion.

8. The method of claim 1, wherein the selectively preventing step comprises acquiring a non-blocking drain on the portion of the database between the original location and the updated location.

9. The method of claim 1, wherein the selectively preventing step comprises blocking entrance to the portion of the database between the original location and the updated location and waiting for transactions already in the portion to exit before changing the location of the updated record in the database from the original location to the updated location.

10. The method of claim 1, the selectively preventing step comprises changing the location of the updated record in the database only after acquiring a conditional non-blocking drain on at least the portion of the table between the original location and updated location.

11. The method of claim 1, wherein the original location and the updated location are in different partitions.

12. The method of claim 1, further comprising the step of performing the selectively preventing step depending upon a degree of concurrency desired.

13. The method of claim 12, wherein the degree of concurrency is selected from a group comprising minimal concurrency, moderate concurrency, and full concurrency.

14. The method of claim 1, further comprising the steps of:
   creating an overflow record from the updated record and storing the overflow record at an overflow location; and
   creating a pointer record that points to the overflow location and storing the pointer record at the original location.

15. The method of claim 14, further comprising the steps of:
   collapsing the pointer record into the overflow record to create the updated record stored at the updated location; and
   deleting the pointer record from the original location.

16. The method of claim 15, wherein the selectively preventing step further comprises performing the collapsing step only after acquiring a conditional non-blocking drain on at least the portion of the database between the original location and the updated location.

17. The method of claim 15, wherein the database further comprises an index that points to the original location.

18. The method of claim 17, further comprising the step of modifying the index to directly reference the updated location of the updated record.

19. The method of claim 18, further comprising the step of having the index continue to point to the original location after the creating steps.

20. The method of claim 14, further comprising the step of performing the creating steps depending upon a degree of concurrency desired.

21. The method of claim 20, wherein the degree of concurrency is selected from a group comprising minimal concurrency, moderate concurrency, and maximal concurrency.

22. A computer-implemented database management system, comprising:
   (a) a computer;
   (b) means, performed by the computer, for detecting that an update to a record will cause the record to change locations in a database from an original location to an updated location, and
   (c) means, performed by the computer, for selectively preventing activity in the database between the original location and update location until the updated record has changed locations in the database from the original location to the updated location.

23. The system of claim 22, wherein the means for selectively preventing comprises means for taking exclusive control of at least a portion of the database between the original location and the updated location until the updated record has changed locations in the database from the original location to the updated location.

24. The system of claim 22, wherein the means for selectively preventing comprises means for preventing any transaction other than the update from retrieving the record until after it is moved to the updated location.

25. The system of claim 22, wherein the means for selectively preventing comprises means for preventing scan operations of at least a portion of the database between the original location and the updated location, while allowing probe operations of the portion of the database between the original location and the updated location.

26. The system of claim 25, wherein the means for preventing comprises means for taking a low level lock on either the original location or the updated location, depending upon whichever would be visited earlier by the scan operation.

27. The system of claim 22, wherein the means for selectively preventing comprises means for pausing until all transactions in the portion of the database between the original location and the updated location have completed.

28. The system of claim 22, wherein the means for selectively preventing comprises means for pausing to allow transactions to exit the portion of the database between the original location and the updated location while blocking new transactions from entering the portion.

29. The system of claim 22, wherein the means for selectively preventing comprises means for acquiring a non-blocking drain on the portion of the database between the original location and the updated location.

30. The system of claim 22, wherein the means for selectively preventing comprises means for blocking entrance to the portion of the database between the original location and the updated location and waiting for transactions already in the portion to exit before changing the location of the updated record in the database from the original location to the updated location.

31. The system of claim 22, wherein the means for selectively preventing comprises means for changing the location of the updated record in the database only after acquiring a conditional non-blocking drain on at least the portion of the table between the original location and updated location.

32. The system of claim 22, wherein the original location and the updated location are in different partitions.

33. The system of claim 22, further comprising means for performing the means for selectively preventing depending upon a degree of concurrency desired.

34. The system of claim 33, wherein the degree of concurrency is selected from a group comprising minimal concurrency, moderate concurrency, and full concurrency.

35. The system of claim 22, further comprising:
means for creating an overflow record from the updated record and storing the overflow record at an overflow location; and
means for creating a pointer record that points to the overflow location and storing the pointer record at the original location.

36. The system of claim 35, further comprising:
means for collapsing the pointer record into the overflow record to create the updated record stored at the updated location; and
means for deleting the pointer record from the original location.

37. The system of claim 36, wherein the means for selectively preventing further comprises means for performing the means for collapsing only after acquiring a conditional non-blocking drain on at least the portion of the database between the original location and the updated location.

38. The system of claim 37, wherein the database further comprises an index that points to the original location.

39. The system of claim 38, further comprising means for modifying the index to directly reference the updated location of the updated record.

40. The system of claim 39, further comprising means for having the index continue to point to the original location after the means for creating.

41. The system of claim 35, further comprising means for performing the means for creating depending upon a degree of concurrency desired.

42. The system of claim 41, wherein the degree of concurrency is selected from a group comprising minimal concurrency, moderate concurrency, and maximal concurrency.

43. An article of manufacture embodying logic for a method of performing updates in a computer-implemented database management system, the method comprising:
(a) detecting that an update to a record will cause the record to change locations in a database from an original location to an updated location, and
(b) selectively preventing activity in the database between the original location and update location until the updated record has changed locations in the database from the original location to the updated location.

44. The method of claim 43, wherein the selectively preventing step comprises taking exclusive control of at least a portion of the database between the original location and the updated location until the updated record has changed locations in the database from the original location to the updated location.

45. The method of claim 43, wherein the selectively preventing step comprises preventing any transaction other than the update from retrieving the record until after it is moved to the updated location.

46. The method of claim 43, wherein the selectively preventing step comprises preventing scan operations of at least a portion of the database between the original location and the updated location, while allowing probe operations of the portion of the database between the original location and the updated location.

47. The method of claim 46, wherein the preventing and allowing steps comprise taking a low level lock on either the original location or the updated location, depending upon whichever would be visited earlier by the scan operation.

48. The method of claim 43, wherein the selectively preventing step comprises pausing until all transactions in the portion of the database between the original location and the updated location have completed.

49. The method of claim 43, wherein the selectively preventing step comprises pausing to allow transactions to exit the portion of the database between the original location and the updated location while blocking new transactions from entering the portion.

50. The method of claim 43, wherein the selectively preventing step comprises acquiring a non-blocking drain on the portion of the database between the original location and the updated location.

51. The method of claim 43, wherein the selectively preventing step comprises blocking entrance to the portion of the database between the original location and the updated location and waiting for transactions already in the portion to exit before changing the location of the updated record in the database from the original location to the updated location.

52. The method of claim 43, the selectively preventing step comprises changing the location of the updated record in the database only after acquiring a conditional non-blocking drain on at least the portion of the table between the original location and updated location.

53. The method of claim 43, wherein the original location and the updated location are in different partitions.

54. The method of claim 43, further comprising the step of performing the selectively preventing step depending upon a degree of concurrency desired.

55. The method of claim 54, wherein the degree of concurrency is selected from a group comprising minimal concurrency, moderate concurrency, and full concurrency.

56. The method of claim 43, further comprising the steps of:

creating an overflow record from the updated record and storing the overflow record at an overflow location; and creating a pointer record that points to the overflow location and storing the pointer record at the original location.

57. The method of claim 56, further comprising the steps of:

collapsing the pointer record into the overflow record to create the updated record stored at the updated location; and deleting the pointer record from the original location.

58. The method of claim 57, wherein the selectively preventing step further comprises performing the collapsing step only after acquiring a conditional non-blocking drain on at least the portion of the database between the original location and the updated location.

59. The method of claim 57, wherein the database further comprises an index that points to the original location.

60. The method of claim 59, further comprising the step of modifying the index to directly reference the updated location of the updated record.

61. The method of claim 60, further comprising the step of having the index continue to point to the original location after the creating steps.

62. The method of claim 56, further comprising the step of performing the creating steps depending upon a degree of concurrency desired.

63. The method of claim 62, wherein the degree of concurrency is selected from a group comprising minimal concurrency moderate concurrency, and maximal concurrency.

* * * * *